(12) United States Patent
He (10) Patent No.: US 10,914,989 B1
(45) Date of Patent: Feb. 9, 2021

(54) DISPLAY PANEL AND DISPLAY DEVICE

(71) Applicant: TCL CHINA STAR OPTOELECTRONICS TECHNOLOGY CO., LTD., Guangdong (CN)

(72) Inventor: Zijie He, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/619,085

(22) PCT Filed: Nov. 19, 2019

(86) PCT No.: PCT/CN2019/119321
§ 371 (c)(1),
(2) Date: Dec. 4, 2019

(30) Foreign Application Priority Data

Sep. 16, 2019 (CN) .......................... 2019 1 0868703

(51) Int. Cl.
*G02F 1/1339* (2006.01)
*G02F 1/1335* (2006.01)
*G02F 1/1368* (2006.01)

(52) U.S. Cl.
CPC ...... *G02F 1/1339* (2013.01); *G02F 1/133512* (2013.01); *G02F 1/1368* (2013.01)

(58) Field of Classification Search
CPC ............. G02F 1/136286; G02F 1/1368; G02F 1/13454; G02F 1/1339; G02F 1/133512; G09G 3/3688

USPC .................................................. 349/153–154
See application file for complete search history.

(56) References Cited

U.S. PATENT DOCUMENTS

| | | | |
|---|---|---|---|
| 2009/0115933 A1* | 5/2009 | Mimura | ............ G02F 1/133606 349/59 |
| 2010/0214195 A1* | 8/2010 | Ogasawara | ....... G02F 1/136286 345/55 |
| 2011/0013132 A1 | 1/2011 | Chen et al. | |
| 2017/0219895 A1* | 8/2017 | Yu | .......................... G02F 1/1368 |
| 2018/0337217 A1* | 11/2018 | Zang | .................. H01L 51/5281 |

FOREIGN PATENT DOCUMENTS

| | | |
|---|---|---|
| CN | 101957511 A | 1/2011 |
| CN | 103454813 A | 12/2013 |
| CN | 206209257 U | 5/2017 |
| CN | 108364568 A | 8/2018 |
| CN | 109239986 A | 1/2019 |

* cited by examiner

*Primary Examiner* — Charles S Chang
(74) *Attorney, Agent, or Firm* — Mark M. Friedman (57) ABSTRACT

The invention discloses a display panel and a display device. The display panel includes a first substrate and a sealant disposed on the first substrate. The first substrate includes a display area and a bezel area surrounding the display area. The sealant is disposed in the bezel area and surrounds the display area, wherein a widened portion is disposed between the display area and the sealant at a corner to increase a shortest distance between a boundary of the display area and the sealant at the corner.

14 Claims, 5 Drawing Sheets

DISPLAY PANEL AND DISPLAY DEVICE

FIELD OF INVENTION

The present invention relates to the field of display technology, and in particular, to a display panel and a display device.

BACKGROUND OF INVENTION

Thin film transistor liquid crystal displays (TFT-LCDs) include a display area (active area) and a bezel area surrounding the display area. A black matrix is disposed in the bezel area for shielding to prevent light leakage.

A sealant that bonds two substrates in the display is disposed in the bezel area. The sealant is not a complete right angle at the corner and has a certain turning radius, and the display area is generally a right-angled design at the corner so that the sealant at the corner is closer to the display area than anywhere else.

As the bezel of the display becomes narrower, the distance between the sealant and the display area is closer. Once the position and width of the sealant fluctuate during a process, the sealant may overflow into the display area, causing light leakage. However, the distance between the display area and the sealant at the corner is closer, and the risk of an overflow of the sealant is more likely to occur.

Technical Problem

As the bezel of the display becomes narrower, the distance between the sealant and the display area is closer. Once the position and width of the sealant fluctuate during a process, the sealant may overflow into the display area, causing light leakage. However, the distance between the display area and the sealant at the corner is closer, and the risk of an overflow of the sealant is more likely to occur.

SUMMARY OF INVENTION

The invention provides a display panel and a display device, which can prevent a sealant from overflowing at a corner by increasing the distance between the display area and the sealant at the corner, thereby, the technical problem that affects the display is solved.

In order to solve the above problems, the technical solution provided by the present invention is as follows:

The invention provides a display panel, including: a first substrate including a display area and a bezel area surrounding the display area; and a sealant disposed on the first substrate, wherein the sealant is positioned in the bezel area and disposed around the display area; and wherein a widened portion is disposed between the display area and the sealant at a corner to increase a shortest distance between a boundary of the display area and the sealant at the corner.

In an embodiment of the invention, a shape of the display area and a shape of the sealant match each other at the corner.

In an embodiment of the invention, a ratio of a width of the widened portion to a shortest distance between the boundary of the display area and the sealant at a non-corner is greater than or equal to 0.5.

In an embodiment of the invention, the display panel further includes a black matrix disposed on the first substrate, the black matrix includes a first black matrix positioned in the bezel area, and the first black matrix is disposed on both sides of the sealant and surrounds the display area.

In an embodiment of the invention, the first black matrix is provided with the widened portion at the corner, and a position of the first black matrix provided with the widened portion is arced.

In an embodiment of the invention, the black matrix further includes a second black matrix positioned in the display area, and the second black matrix separates the display area into a plurality of sub-pixels.

In an embodiment of the invention, the plurality of sub-pixels includes at least one irregularly shaped sub-pixel positioned at the boundary of the corner of the display area, and the irregularly shaped sub-pixel includes more than one shapes.

In an embodiment of the invention, the plurality of sub-pixels includes a plurality of irregularly shaped sub-pixels positioned within the boundary of the display area at the corner, and the plurality of irregularly shaped sub-pixels includes two or more different shapes.

In an embodiment of the invention, the display panel further includes a second substrate disposed opposite the first substrate, and the first substrate and the second substrate are bonded together by the sealant.

A display device, including a display panel, and wherein the display panel includes: a first substrate including a display area and a bezel area surrounding the display area; and a sealant disposed on the first substrate, wherein the sealant is positioned in the bezel area and disposed around the display area; and wherein a widened portion is disposed between the display area and the sealant at a corner to increase a shortest distance between a boundary of the display area and the sealant at the corner.

In an embodiment of the invention, a shape of the display area and a shape of the sealant match each other at the corner.

In an embodiment of the invention, a ratio of a width of the widened portion to a shortest distance between the boundary of the display area and the sealant at a non-corner is greater than or equal to 0.5.

In an embodiment of the invention, the display panel further includes a black matrix disposed on the first substrate, the black matrix includes a first black matrix positioned in the bezel area, and the first black matrix is disposed on both sides of the sealant and surrounds the display area.

In an embodiment of the invention, the first black matrix is provided with the widened portion at the corner, and a position of the first black matrix provided with the widened portion is arced.

In an embodiment of the invention, the black matrix further includes a second black matrix positioned in the display area, and the second black matrix separates the display area into a plurality of sub-pixels.

In an embodiment of the invention, the plurality of sub-pixel includes at least one irregularly shaped sub-pixel positioned at the boundary of the display area at the corner, and the irregularly shaped sub-pixel includes more than one shapes.

In an embodiment of the invention, the plurality of sub-pixels includes a plurality of irregularly shaped sub-pixels positioned within the display area at the corner, and the plurality of irregularly shaped sub-pixels includes two or more different shapes.

In an embodiment of the invention, the display panel further includes a second substrate disposed opposite the first substrate, and the first substrate and the second substrate are bonded together by the sealant.

In an embodiment of the invention, the sealant and the display area both have a round-corner at the corner.

In an embodiment of the invention, the sealant has a width of 50% to 70% of a width of the bezel area.

BENEFICIAL EFFECT

The invention increases a distance between a display area and a sealant at a corner to reduce the risk of the sealant at the corner overflowing to the display area, thereby reduces the risk of light leakage from the display panel.

DESCRIPTION OF DRAWINGS

In order to more clearly illustrate the embodiments or the technical solutions in the prior art, the drawings used in the embodiments or the prior art will be briefly introduced. It is obvious that the drawings described below are merely some of the embodiments of the invention, and those skilled in the art can obtain other drawings according to the drawings without doing any creative activity.

DETAILED DESCRIPTION OF PREFERRED EMBODIMENTS

The following description of the various embodiments is provided to illustrate the specific embodiments of the invention. Directional terminology mentioned in the present invention, such as "upper", "lower", "front", "behind", "left", "right", "inside", "outside", "side", etc., are merely refer to the directions of the accompanying drawings Therefore, the directional terminology used is for the purpose of illustration and understanding of the invention. In the drawings, structurally similar elements are denoted by the same reference numerals.

The present invention is directed to a conventional display panel and a display device. Since the display area is too close to the sealant at the corner, the sealant easily overflows into the display area, and the present embodiment can solve the problem.

The invention provides a display panel, including: a first substrate including a display area and a bezel area surrounding the display area; a sealant disposed on the first substrate, the sealant is positioned in the bezel area and disposed around the display area; wherein a widened portion is disposed between the display area and the sealant at a corner to increase a shortest distance between a boundary of the display area and the sealant at the corner.

Figure 1A:
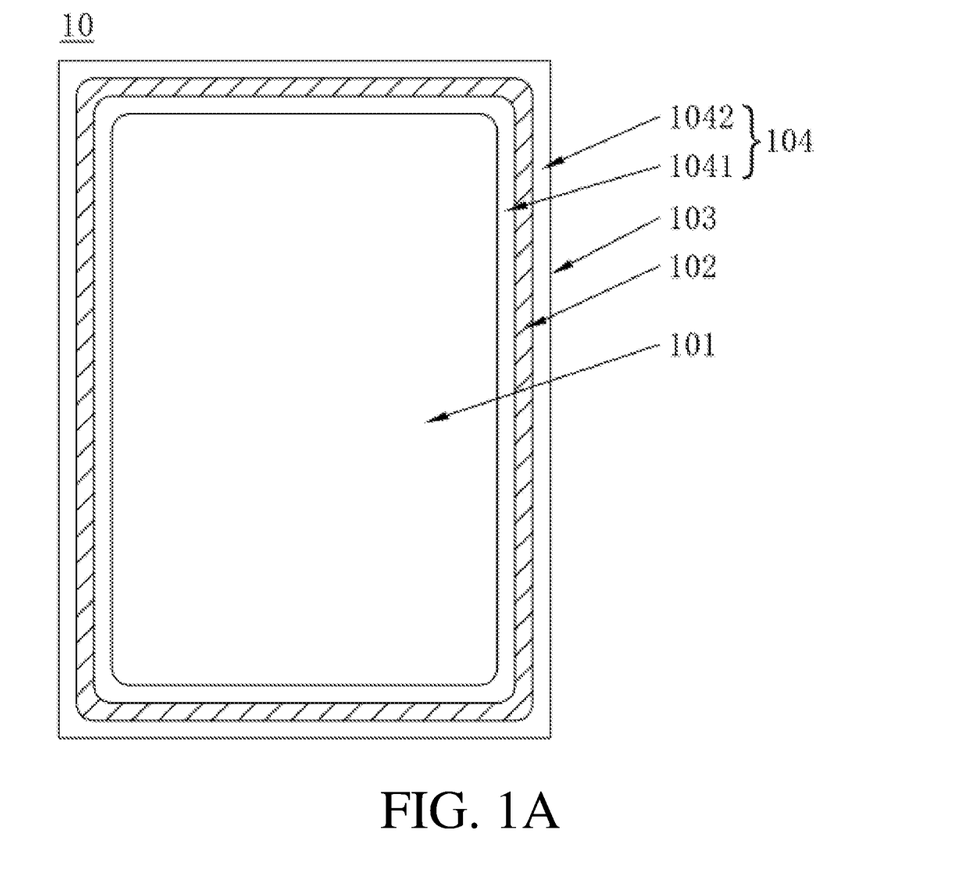
FIG. 1A is a schematic top plan view of a display panel according to an embodiment of the present invention.
Figure 1B:
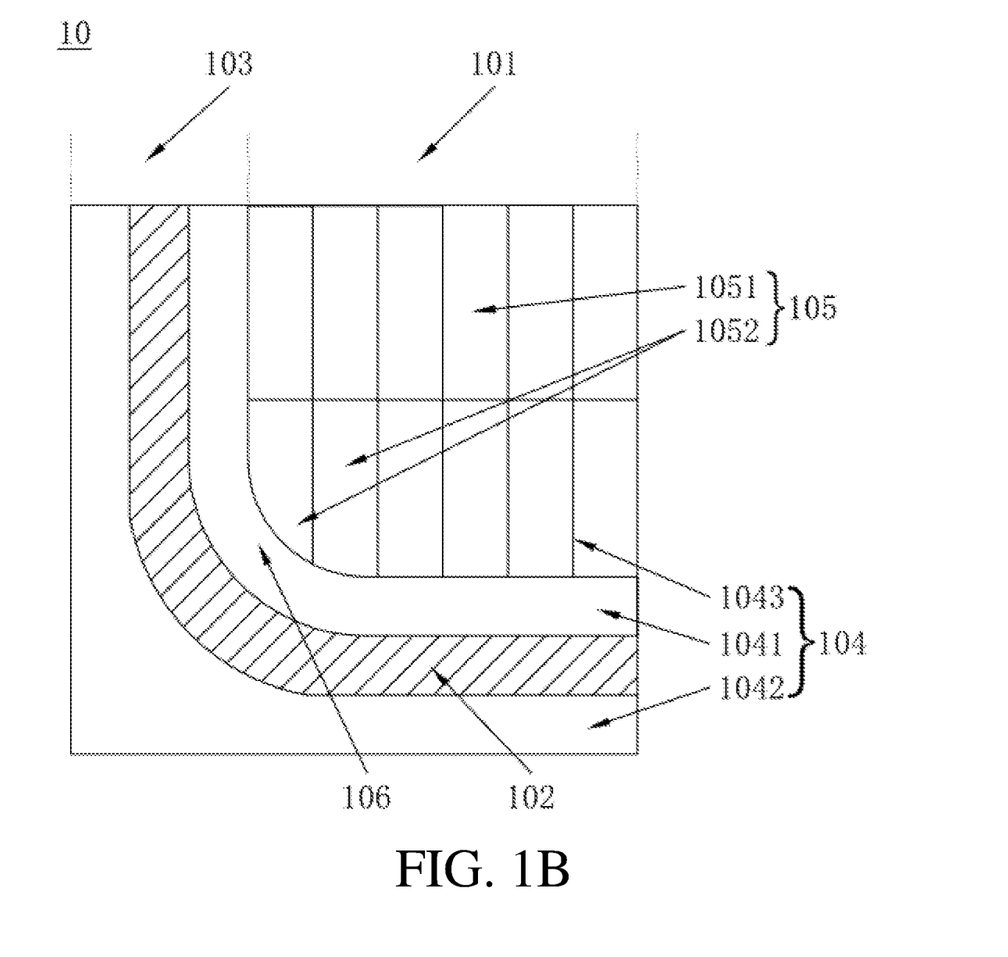
FIG. 1B is a schematic structural diagram of a first substrate according to an embodiment of the present invention.

Specifically, as shown in FIG. 1A and FIG. 1B. They are respectively a schematic plan view of a display panel and a schematic diagram of a first substrate structure.

The display panel includes a first substrate 10, and the first substrate 10 includes a display area 101 and a bezel area 103 around the display area 101.

A sealant 102 is further disposed on the first substrate 10, and the sealant 102 is positioned in the bezel area 103 and disposed around the display area 101.

A widened portion 106 is disposed between the display area 101 and the sealant 102 at a corner to increase a shortest distance between a boundary of the display area 101 and the sealant 102 at the corner.

In the specific process, on the substrate, the sealant is not a complete right angle at the corner but has a certain turning radius. However, the display area is generally rectangular at the corner, which causes the display area to be closer to the sealant at the corner than elsewhere. Once the position and width of the sealant fluctuate during a process, the sealant may overflow to the display area. However, the distance between the display area and the sealant at the corner is closer, a risk of overflowing the sealant is higher. In this embodiment, the risk of the sealant overflowing into the display area is reduced by increasing the shortest distance between the display area and the sealant at the corner, and thereby, the risk of light leakage of the display panel is reduced.

Further, as shown in FIG. 1A and FIG. 1B. A shape of the display area 101 and a shape of the sealant 102 match each other at the corner.

That is when the sealant 102 has a non-right angle at the corner, the display area 101 is also not a right angle at the corner and has the same shape as the sealant 102.

Specifically, the sealant 102 and the display area 101 both may have a round-corner, or may have an arc shape.

When the shapes of the display area 101 and the sealant 102 are the same at the corner, it can be ensured that the shortest distance between the display area 101 and the sealant 102 does not suddenly become less at the corner, resulting in a risk that the sealant 102 may overflow into the display area 101.

A ratio of a width of the widened portion 106 to a shortest distance between a boundary of the display area 101 and the sealant 102 at a non-corner is greater than or equal to 0.5.

That is, a ratio of the shortest distance between the sealant 102 and the display area 101 at the corner to the shortest distance between the sealant 102 and the display area 101 at the non-corner is greater than or equal to 0.5.

The sealant 102 is disposed in the bezel area 103 and disposed around the display area 101, and the width of the sealant 102 is 50% to 70% of the width of the bezel area.

In addition, the display panel further includes a black matrix 104 disposed on the first substrate 10, and the black matrix 104 includes a first black matrix 1041 and 1042 positioned in the bezel area 103, and the first black matrix 1041 and 1042 is disposed on both sides of the sealant 102 and surrounds the display area 101.

The first black matrix is provided with the widened portion 106 at the corner, and a position of the first black matrix provided with the widened portion 106 is arced.

The first black matrix 1041 and 1042 includes an inner bezel 1041 between the display area 101 and the sealant 102, and an outer bezel 1042 positioned on a side of the sealant 102 away from the display area 101. In addition, the inner bezel 1041 is provided with the widened portion 106 at the corner, and the position of the inner bezel 1041 provided with the widened portion 106 is arced.

In addition, the width of the inner bezel 1041 at the corner is at least 0.5 times the width of the inner bezel 1041 at the non-corner to meet a ratio of the shortest distance between the sealant 102 and the display area 101 at the corner to the shortest distance between the sealant 102 and the display area 101 at the non-corner is greater than or equal to 0.5.

Similarly, a shape of the inner bezel 1041 and a shape of the sealant 102 match each other at the corner.

That is, the inner bezel 1041 and the sealant 102 both may have a round-corner or other arc shapes at the corner. In addition, the distance between the display area 101 and the sealant 102 can be regulated by adjusting the numerical relationship between the turning radius of the inner bezel 1041 and the turning radius of the sealant 102 to meet a ratio of the shortest distance between the sealant 102 and the display area 101 at the corner to the shortest distance between the sealant 102 and the display area 101 at the non-corner is greater than or equal to 0.5.

In addition, as shown in FIG. 1B, the black matrix 104 further includes a second black matrix 1043 positioned in the display area 101, and the second black matrix 1043 divides the display area 101 into a plurality of sub-pixels 105. Moreover, two, three or four sub-pixels may constitute a pixel unit to constitute a display image of the display area 101.

A plurality of sub-pixels 105 includes at least one irregularly shaped sub-pixel 1052 within a boundary of the display area 101 at a corner and a regular sub-pixel 1051 within the remaining area. The irregularly shaped sub-pixel 1052 includes more than one shape, that is, may be only one irregularly shaped sub-pixels 1052 attached to the boundary of the display area 101 at the corner, so that the plurality of sub-pixels fills the entire display area 101 to improve the display effect of the display area 101.

Alternatively, the plurality of sub-pixels 105 includes a plurality of irregularly shaped sub-pixels 1052 within a boundary of the display area 101 at the corner, and the plurality of irregularly shaped sub-pixels 1052 include two or more different shapes. That is, at least two irregularly shaped sub-pixels 1052 are attached to the boundary of the display area 101 at the corner so that the plurality of sub-pixels fills the entire display area 101 to improve the display effect of the display area 101.

As shown in FIG. 1B, in the present embodiment, the regular sub-pixel 1051 may be a rectangle, and a side of the boundary of the display area 101 is configured to match the shape of the display area 101, for example, an arc shape or other irregular shapes, which is not limited herein.

In addition, the display panel includes a second substrate, and the second substrate is disposed opposite to the first substrate 10, and the first substrate 10 and the second substrate are bonded to each other by the sealant 102.

The following is a description of specific embodiments.

Embodiment 1

Figure 2:
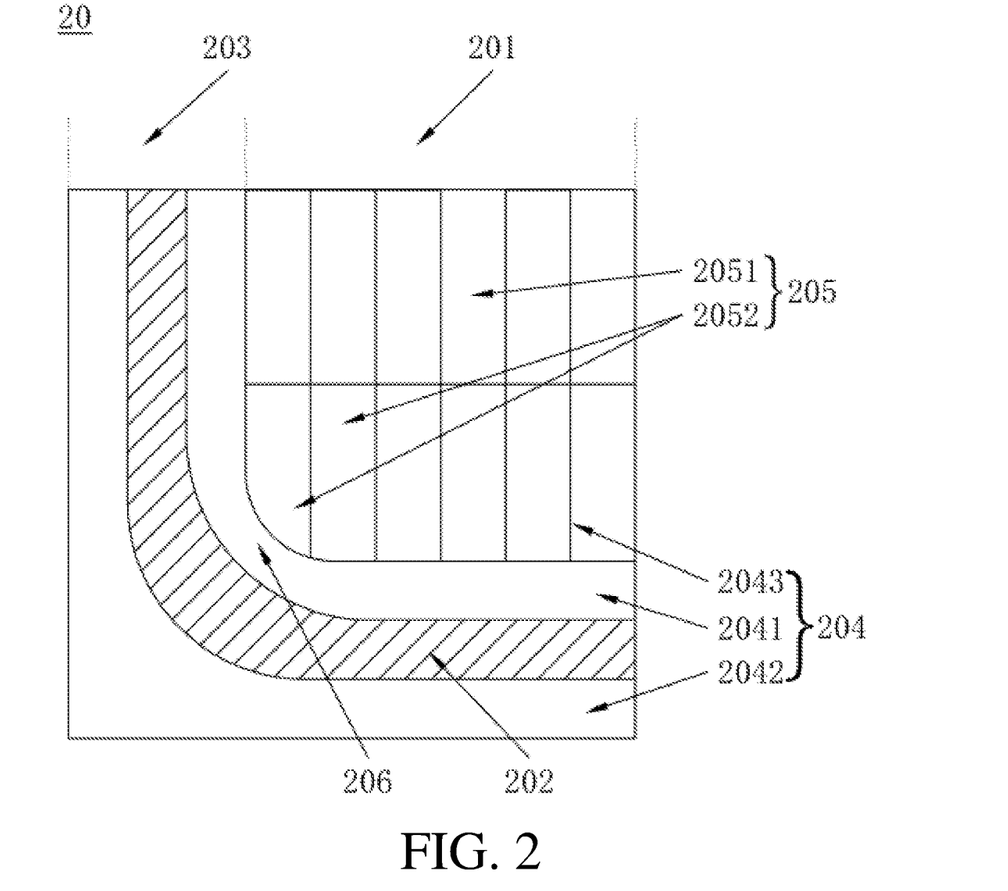
FIG. 2 is a schematic structural diagram of another first substrate according to an embodiment of the present invention.

As shown in FIG. 2, the first substrate 20 includes a display area 201 and a bezel area 203, and the bezel area 203 is provided with a sealant 202 surrounding the display area 201.

The black matrix 204 is further disposed on the first substrate 20, and the black matrix 204 includes first black matrices 2041 and 2042 positioned in the bezel area 203 and a second black matrix 2043 disposed in the display area 201, wherein the first black matrices 2041 and 2042 include an inner bezel 2041 between the display area 201 and the sealant 202 and an outer bezel 2042 positioned on a side of the sealant 202 away from the display area 201.

The inner bezel 2041 is provided with the widened portion 206 at the corner, and a position of the inner bezel 2041 provided with the widened portion 206 is arced.

In addition, the second black matrix 2043 separates the display area 201 into a plurality of sub-pixel 205, including irregularly shaped sub-pixels 2052 within the display area 201 at the corner and regular sub-pixels 2051 within the remaining area.

The ratio of a width of the widened portion 206 to a shortest distance between a boundary of the display area 201 and the sealant 202 at a non-corner is equal to 0.5.

That is, a ratio of the shortest distance between the boundary of the display area 201 and the sealant 202 at the corner and the shortest distance between the boundary of the display area 201 and the sealant 202 at the non-corner is equal to 0.5.

The display area 201 and the sealant 202 both have a round-corner at the corner.

The inner bezel 2041 and the sealant 202 both have a round-corner at the corner.

A width of the inner bezel 2041 at the corner is less than a width of the inner bezel 2041 at the non-corner.

The irregularly shaped sub-pixels 2052 are attached to the boundary of the display area 201 at the corner.

This embodiment increases the shortest distance between the display area and the sealant at the corner, a risk of the sealant overflowing into the display area is reduced, thereby, a risk of light leakage of the display panel is reduced.

Embodiment 2

Figure 3:
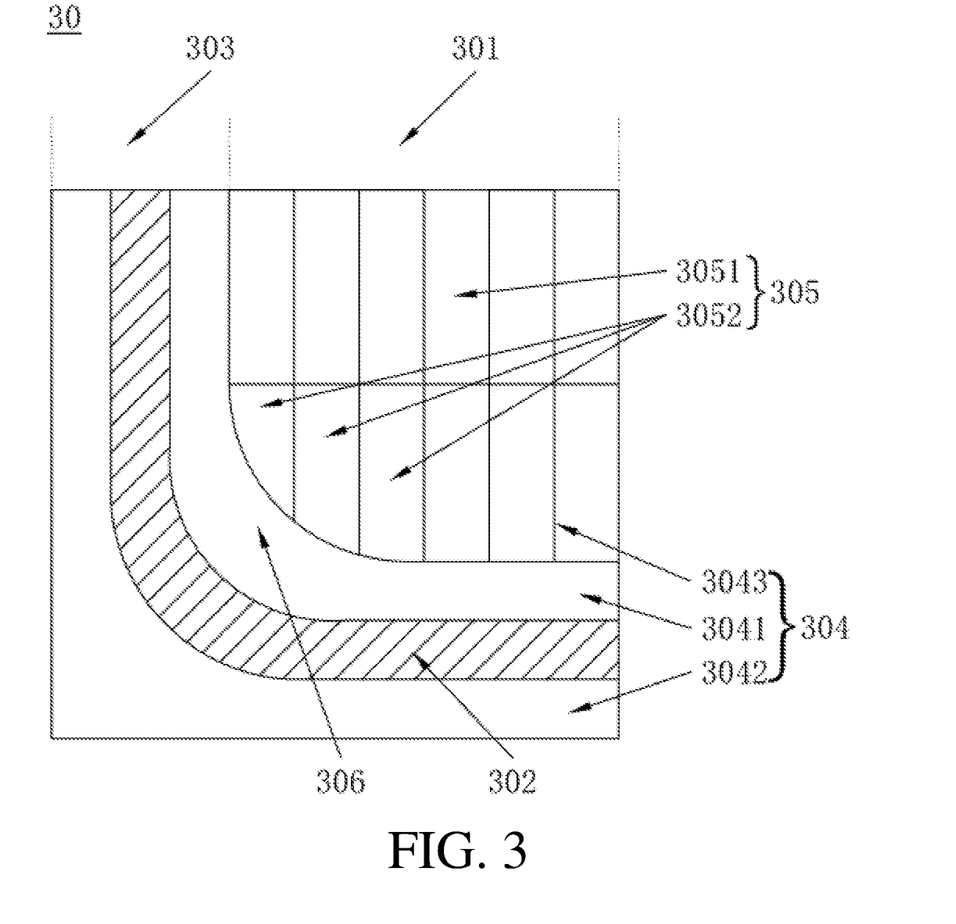
FIG. 3 is a schematic structural diagram of yet another first substrate according to an embodiment of the present invention.

As shown in FIG. 3, the first substrate 30 includes a display area 301 and a bezel area 303, and the bezel area 303 is provided with a sealant 302 surrounding the display area 301.

The black matrix 304 is further disposed on the first substrate 30, and the black matrix 304 includes first black matrices 3041 and 3042 positioned in the bezel area 303, and a second black matrix 3043 disposed in the display area 301, wherein the first black matrices 3041 and 3042 include an inner bezel 3041 between the display area 301 and the sealant 302 and an outer bezel 3042 positioned on a side of the sealant 302 away from the display area 301.

The inner bezel 3041 is provided with the widened portion 306 at the corner, and a position of the inner bezel 3041 provided with the widened portion 306 is arced.

In addition, the second black matrix 3043 separates the display area 301 into a plurality of sub-pixel 305, including irregularly shaped sub-pixels 3052 within the display area 301 at a corner and regular sub-pixel 3051 within the remaining area.

The ratio of a width of the widened portion 306 to a shortest distance between a boundary of the display area 301 and the sealant 202 at a non-corner is greater than 1.

That is, a ratio of the shortest distance between the boundary of the display area 301 and the sealant 302 at the corner and the shortest distance between the boundary of the display area 301 and the sealant 302 at the non-corner is greater than 1.

The display area 301 and the sealant 302 both have a round-corner at the corner.

The inner bezel 3041 and the sealant 302 both have a round-corner at the corner.

A width of the inner bezel 3041 at the corner is less than a width of the inner bezel 3041 at the non-corner.

The irregularly shaped sub-pixels 3052 are attached to the boundary of the display area 301 at the corner.

This embodiment increases the shortest distance between the display area and the sealant at the corner, a risk of the sealant overflowing into the display area is reduced, thereby, a risk of light leakage of the display panel is reduced.

Embodiment 3

Figure 4:
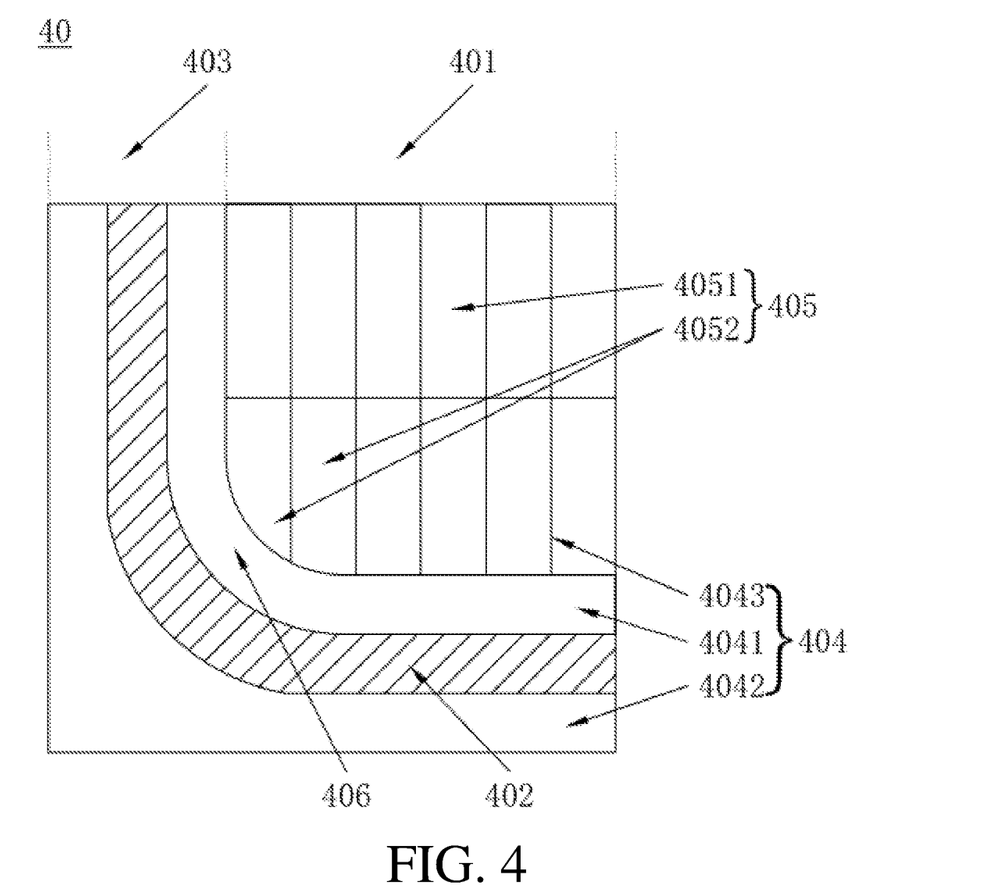
FIG. 4 is a schematic structural diagram of still yet another first substrate according to an embodiment of the present invention.

As shown in FIG. 4, the first substrate 40 includes a display area 401 and a bezel area 403, and the bezel area 403 is provided with a sealant 402 surrounding the display area 401.

The black matrix 404 is further disposed on the first substrate 40, and the black matrix 404 includes first black matrices 4041 and 4042 positioned in the bezel area 403, and a second black matrix 4043 disposed in the display area 401, wherein the first black matrices 4041 and 4042 include an inner bezel 4041 between the display area 401 and the sealant 402 and an outer bezel 4042 positioned on a side of the sealant 402 away from the display area 401.

The inner bezel 4041 is provided with the widened portion 406 at the corner, and a position of the inner bezel 4041 provided with the widened portion 406 is arced.

In addition, the second black matrix 4043 separates the display area 401 into a plurality of sub-pixel 405, including irregularly shaped sub-pixels 4052 within the display area 401 at a corner, and regular sub-pixels 4051 within the remaining area.

The ratio of a width of the widened portion 406 to a shortest distance between a boundary of the display area 401 and the sealant 402 at a non-corner is equal to 1.

That is, a ratio of the shortest distance between the boundary of the display area 401 and the sealant 402 at the corner and the shortest distance between the boundary of the display area 401 and the sealant 402 at the non-corner is equal to 1.

The display area 401 and the sealant 402 both have a round-corner at the corner.

The inner bezel 4041 and the sealant 402 both have a round-corner at the corner.

A width of the inner bezel 4041 at the corner is equal to a width of the inner bezel 4041 at the non-corner.

The irregularly shaped sub-pixels 4052 are attached to the boundary of the display area 501 at the corner.

This embodiment increases the shortest distance between the display area and the sealant at the corner, a risk of the sealant overflowing into the display area is reduced, thereby, a risk of light leakage of the display panel is reduced.

In addition, an embodiment of the present invention further provides a display device, and the display device includes the above-mentioned display panel.

The display device may be a thin film transistor liquid crystal display.

As mentioned above, the invention reduces the risk of the sealant overflowing to the display area at a corner by increasing the distance between the display area and the sealant at the corner, thereby reducing the risk of light leakage of the display panel and improving the display effect of the display device.

The description of the above exemplary embodiments is only for the purpose of understanding the invention. It is to be understood that the present invention is not limited to the disclosed exemplary embodiments. It is obvious to those skilled in the art that the above exemplary embodiments may be modified without departing from the scope and spirit of the present invention.

What is claimed is:

1. A display panel, comprising:
    a first substrate comprising a display area and a bezel area surrounding the display area;
    a sealant disposed on the first substrate, wherein the sealant is positioned in the bezel area and disposed around the display area;
    a black matrix disposed on the first substrate, wherein the black matrix comprises a first black matrix positioned in the bezel area, and the first black matrix is disposed on both sides of the sealant and surrounds the display area;
    wherein a shortest distance between a boundary of the display area and the sealant at a corner of the first substrate is greater than a shortest distance between the boundary of the display area and the sealant at a non-corner of the first substrate; and
    wherein the first black matrix is provided with a widened portion at the corner of the first substrate, and a contour of the widened portion close to the display area is arced.

2. The display panel according to claim 1, wherein a shape of the display area and a shape of the sealant match each other at the corner.

3. The display panel according to claim 1, wherein the black matrix further comprises a second black matrix positioned in the display area, and the second black matrix separates the display area into a plurality of sub-pixel.

4. The display panel according to claim 3, wherein the plurality of sub-pixel comprises at least one irregularly shaped sub-pixel positioned at the boundary of the corner of the display area, and the irregularly shaped sub-pixel comprises more than one shapes.

5. The display panel according to claim 3, wherein the plurality of sub-pixels comprises a plurality of irregularly shaped sub-pixels positioned within the boundary of the display area at the corner, and the plurality of irregularly shaped sub-pixels comprises two or more different shapes.

6. The display panel according to claim 1, further comprising a second substrate disposed opposite the first substrate, and the first substrate and the second substrate are bonded together by the sealant.

7. A display device, comprising a display panel, and wherein the display panel comprises:
    a first substrate comprising a display area and a bezel area surrounding the display area;
    a sealant disposed on the first substrate, wherein the sealant is positioned in the bezel area and disposed around the display area;
    a black matrix disposed on the first substrate, wherein the black matrix comprises a first black matrix positioned in the bezel area, and the first black matrix is disposed on both sides of the sealant and surrounds the display area;
    wherein a shortest distance between a boundary of the display area and the sealant at a corner of the first substrate is greater than a shortest distance between the boundary of the display area and the sealant at a non-corner of the first substrate; and
    wherein the first black matrix is provided with a widened portion at the corner of the first substrate, and a contour of the widened portion close to the display area is arced.

8. The display device according to claim 7, wherein a shape of the display area and a shape of the sealant match each other at the corner.

9. The display device according to claim 7, wherein the black matrix further comprises a second black matrix positioned in the display area, and the second black matrix separates the display area into a plurality of sub-pixels.

10. The display device according to claim 9, wherein the plurality of sub-pixels comprises at least one irregularly shaped sub-pixel positioned at the boundary of the corner of the display area, and the irregularly shaped sub-pixel comprises more than one shapes.

11. The display device according to claim 9, wherein the plurality of sub-pixels comprises a plurality of irregularly shaped sub-pixels positioned within the boundary of the display area at the corner, and the plurality of irregularly shaped sub-pixels comprises two or more different shapes.

12. The display device according to claim 7, wherein the display panel further comprises a second substrate disposed opposite the first substrate, and the first substrate and the second substrate are bonded together by the sealant.

13. The display device according to claim 7, wherein the sealant and the display area both have a round-corner at the corner.

14. The display device according to claim 7, wherein the sealant has a width of 50% to 70% of a width of the bezel area.

\* \* \* \* \*